United States Patent
Natarajan et al.

(10) Patent No.: US 9,118,589 B2
(45) Date of Patent: Aug. 25, 2015

(54) SYSTEM AND METHOD FOR RAPID VLT CONNECTION FAILURE HANDLING

(71) Applicant: Dell Products L.P., Round Rock, TX (US)

(72) Inventors: Avinash Natarajan, Chennai (IN); Ramasubramani Mahadevan, Chennai (IN); K. P. Balasubramanian, Chennai (IN)

(73) Assignee: Dell Products, L.P., Round Rock, TX (US)

( * ) Notice: Subject to any disclaimer, the term of this patent is extended or adjusted under 35 U.S.C. 154(b) by 178 days.

(21) Appl. No.: 13/792,842

(22) Filed: Mar. 11, 2013

(65) Prior Publication Data

US 2014/0254352 A1    Sep. 11, 2014

(51) Int. Cl.
| | |
|---|---|
| *H04L 12/28* | (2006.01) |
| *H04L 12/703* | (2013.01) |
| *H04L 12/709* | (2013.01) |
| *H04J 1/16* | (2006.01) |
| *H04L 12/743* | (2013.01) |
| *H04L 12/707* | (2013.01) |

(52) U.S. Cl.
CPC .............. *H04L 45/28* (2013.01); *H04L 45/245* (2013.01); *H04L 45/22* (2013.01); *H04L 45/7453* (2013.01)

(58) Field of Classification Search
USPC .......................... 370/227, 228, 250, 389, 386
See application file for complete search history.

(56) References Cited

U.S. PATENT DOCUMENTS

| | | | |
|---|---|---|---|
| 7,606,203 B1* | 10/2009 | Shabtay et al. | 370/332 |
| 2004/0230885 A1* | 11/2004 | Newcombe et al. | 714/758 |
| 2007/0091796 A1* | 4/2007 | Filsfils et al. | 370/228 |
| 2011/0069620 A1* | 3/2011 | Gintis et al. | 370/250 |
| 2014/0090031 A1* | 3/2014 | Keeler et al. | 726/4 |
| 2014/0143854 A1* | 5/2014 | Lopez et al. | 726/14 |

* cited by examiner

*Primary Examiner* — John Pezzlo
(74) *Attorney, Agent, or Firm* — Haynes & Boone, LLP

(57) ABSTRACT

A system and method for rapid virtual link trunk connection failure handling includes receiving a packet at a first network switching unit where the packet is to be forwarded to a second network switching unit, detecting a failure in a network connection between the first network switching unit and the second network switching unit and associated with a first LAG of the first network switching unit, determining a second LAG associated with an inter-chassis link (ICL) as a failover LAG for the first LAG, redirecting the packet to the second LAG, altering the packet to set a redirection status bit to a logic value, and forwarding the altered packet using the ICL.

19 Claims, 7 Drawing Sheets

SYSTEM AND METHOD FOR RAPID VLT CONNECTION FAILURE HANDLING

BACKGROUND

The present disclosure relates generally to information handling systems, and more particularly to rapid virtual link trunk connection failure handling.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion using virtual link trunking (VLT). In a VLT, multiple network links and/or nodes are often bundled into a group to support the parallelization function. For suitably aware network switching products, the VLT can offer a flexible option to select any of the network links in the VLT. The network switching products may also ignore the VLT and treat the network links as separate links and utilize them in a more traditional fashion. And while VLTs offer additional flexibility in network topologies they also add complexity to the forwarding function.

One function of network switching products is to deal with failures in the networks they are receiving network packets from or forwarding packets to. For example, the network switching products should be able to deal with failures in the connections between themselves and their neighboring network switching products.

Accordingly, it would be desirable to provide improved network switching products that can deal with connection failures by forwarding around failure points while minimizing adverse impact on network traffic. It would also be desirable to provide network switching products that can deal with connection failures while taking advantage of the features of VLTs.

SUMMARY

According to one embodiment, a method of connection failure handling includes receiving a packet at a first network switching unit where the packet is to be forwarded to a second network switching unit, detecting a failure in a network connection between the first network switching unit and the second network switching unit and associated with a first LAG of the first network switching unit, determining a second LAG associated with an inter-chassis link (ICL) as a failover LAG for the first LAG, redirecting the packet to the second LAG, altering the packet to set a redirection status bit to a logic value, and forwarding the altered packet using the ICL.

According to another embodiment, a method of forwarding includes receiving a packet at a first network switching unit from a second network switching unit over an inter-chassis link where the packet is to be forwarded to a third network switching unit, determining whether the packet includes a redirection status bit set to a first logic value, and when the redirection status bit is set to the first logic value altering the packet by setting the redirection status bit to a second logic value different from the first logic value and forwarding the altered packet to the third network switching unit. The first network switching unit and the second network switching unit are peers.

According to yet another embodiment, an information handling system includes a communications network. The communications network includes a first network switching unit, a first LAG coupling the first network switching unit to a second network switching unit, and a second LAG coupling the first network switching unit to a peer unit using an inter-chassis link (ICL). The first network switching unit is configured to receive a first packet, where the packet is to be forwarded to the second network switching unit, detect a failure in a network connection between the first network switching unit and the second network switching unit, determine that the second LAG is a failover LAG for the first LAG, redirect the first packet to the second LAG, alter the first packet to set a first CFI bit to 1, and forward the altered first packet using the ICL. The network connection is associated with the first LAG;

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
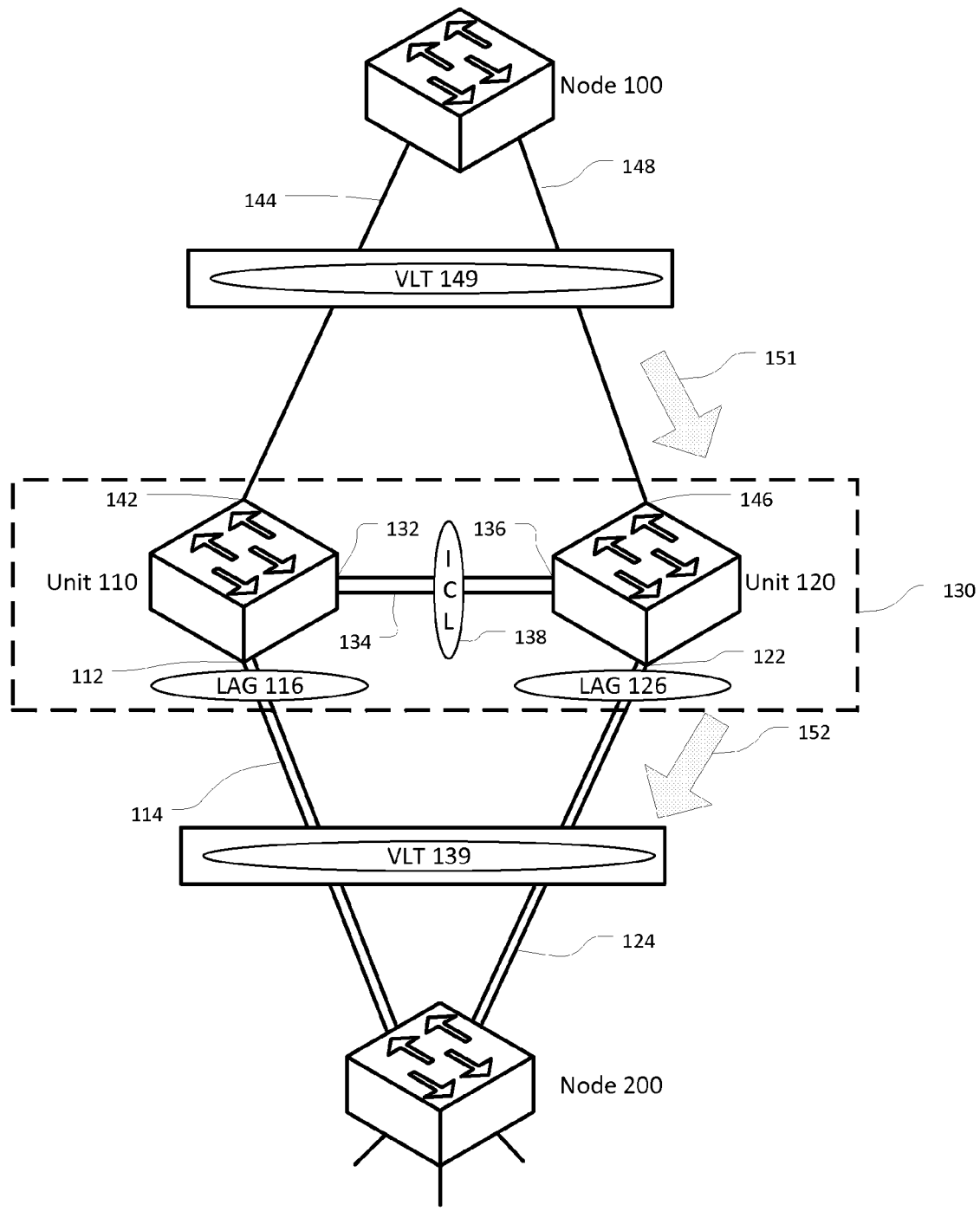
FIG. 1 is a simplified diagram of a network including several VLTs according to some embodiments.

FIG. 1 is a simplified diagram of a network including several VLTs according to some embodiments. As shown in FIG. 1, a network switching device or node 100 has several options for forwarding and/or routing network packets to a network switching device or node 200. More specifically, node 100 can forward packets to node 200 using one of several paths that utilize intervening network switching units or more simply units 110 and 120.

In the particular configuration of FIG. 1, both units 110 and 120 may take advantage of parallelization in the network links between themselves and both nodes 100 and 200. As FIG. 1 shows, unit 110 may include one or more communication ports (i.e., ports) 112 that may be coupled to one or more corresponding network links 114 for coupling unit 110 to node 200. Because unit 110 includes one or more ports 112 coupled to one or more network links 114 for exchanging network traffic with the same destination (i.e., node 200), unit 110 may combine the one or more ports 112 into a single forwarding unit or link aggregation group (LAG) 116. When unit 110 needs to forward network traffic to node 200 it may do so by directing the network traffic to LAG 116 where a LAG hashing mechanism may be used to choose from the one or more ports 112 and corresponding network links 114. Similarly, unit 120 may include one or more ports 122 that may be coupled to one or more corresponding network links 124 for coupling unit 120 to node 200. Because unit 120 includes one or more ports 122 coupled to one or more network links 124 for exchanging network traffic with the same destination (i.e., node 200), unit 120 may combine the one or more ports 122 into a LAG 126. When unit 120 needs to forward network traffic to node 200 it may do so by directing the network traffic to LAG 126 where a LAG hashing mechanism may be used to choose from the one or more ports 122 and corresponding network links 124.

Because unit 110 and 120 both have connections to both node 100 and node 200, they may be clustered together to form a peer group 130 where unit 100 and unit 120 are considered peer units. As shown in FIG. 1, unit 110 may include one or more ports 132 that may be coupled to one or more corresponding network links 134. Unit 120 may also include one or more ports 136 that may be coupled to the one or more corresponding network links 134. Because unit 110 and unit 120 are in the peer group 130, the one or more network links 134 may form an inter-chassis link (ICL) 138. In some embodiments, unit 110 may additionally combine the one or more ports 132 into a LAG. In some embodiments, unit 120 may additionally combine the one or more ports 136 into a LAG. In some embodiments, because unit 110 and unit 120 are in the peer group 130, the one or more network links 114 and the one more network links 124 may form a VLT 139 coupling the peer group 130 with the node 200.

Although depicted in somewhat simpler form, peer group 130 may be coupled similarly to node 100. Unit 110 may include one or more ports 142 that may be coupled to one or more corresponding network links 144 that may couple unit 110 to node 100. Similarly, unit 120 may include one or more ports 146 that may be coupled to one or more corresponding network links 148 that may couple unit 120 to node 100. In some embodiments, because unit 110 and unit 120 are in the peer group 130, the one or more network links 144 and the one more network links 148 may form a VLT 149 coupling the peer group 130 with the node 100.

The network in FIG. 1 demonstrates many different types of parallelism. In some examples, there may be local parallelism between individual switches and nodes. For example, the one or more network links 114 provide more than one localized path between unit 110 and node 200. In some examples, there may be parallelism due to the presence of the VLTs 139 and 149 and the peer group 130. For example, node 100 may forward network traffic to node 200 via either unit 110 or unit 120. As the example in FIG. 1 shows, node 100 may forward network traffic to node 200 using unit 120. Node 100 may first forward the network traffic to unit 120 along the one or more network links 148 to the one or more ports 146 as depicted by the flow arrow 151. Once the network traffic arrives at unit 120, unit 120 may forward the network traffic on to node 200 by directing the network traffic using LAG 126 as depicted by flow arrow 152. LAG 126 may be used to hash the network traffic to the one or more ports 122 where it is placed on the one or more corresponding network links 124 and on to node 200. According to some embodiments, the network traffic could alternatively be directed to unit 110 along the one or more network links 144, and unit 110 could then forward it to node 200 using the LAG 116. According to some embodiments, either unit 110 or unit 120 could forward the network traffic along the ICL 138 to its peer unit (i.e., unit 120 or unit 110 respectively), which could then forward the network traffic on to unit 200.

Figure 2:
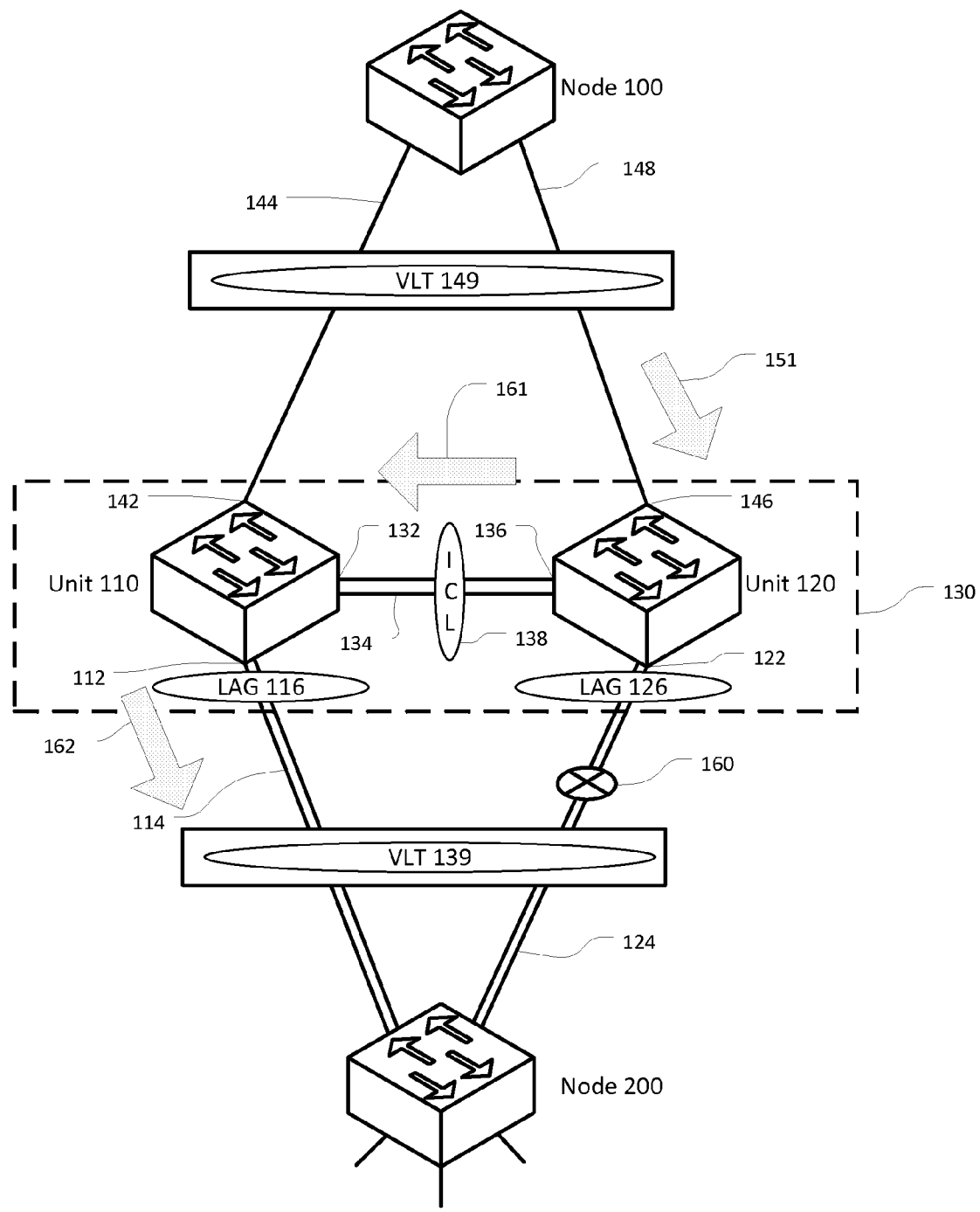
FIG. 2 is a simplified diagram of the network of FIG. 1 with a connection failure between two switching units according to some embodiments.

FIG. 2 is a simplified diagram of the network of FIG. 1 with a connection failure 160 between two switching units according to some embodiments. As shown in FIG. 2, the connection between unit 120 and node 200 has failed as depicted by failure 160. In some examples, the failure 160 may be a failure in the one or more ports 122. In some examples, the failure 160 may be a failure in the one or more network links 124. In some examples, the failure 160 may be a failure at node 200. In some examples, the failure 160 may include a combination of port, network link, and/or other failures. As a result of the failure 160, it is no longer possible for packets to be forwarded from unit 120 to node 200 using the one or more network links 124. In a network without parallelization or redundancy, this might isolate node 200 and points beyond in the network. Such is not the case here. Unit 120 is aware that it is part of peer group 130 and has access to VLT 139. As a result, unit 120 knows that it has peer units, specifically unit 110, that can also reach node 200. Thus, when unit 120 receives packets from node 100 at the one or more ports 146 as depicted by flow arrow 151, unit 120 is able to forward the network traffic around the failure 160. Unit 120 may do this by forwarding the network traffic for node 200 to unit 110 using ICL 138 as depicted by flow arrow 161. Once the packets arrive at unit 110 they may be forwarded using LAG 116 and the one or more network links 114 to node 200 as depicted by flow arrow 162.

As discussed above and further emphasized here, FIGS. 1 and 2 are merely examples, which should not unduly limit the scope of the claims. One of ordinary skill in the art would recognize many variations, alternatives, and modifications. According to some embodiments, the peer group 130 may include more than two units functioning in parallel. This arrangement allows unit 120 to choose from multiple peer units to forward network traffic around the failure 160. According to some embodiments, the number of network links in the one or more network links 114, the one or more network links 124, the one or more network links 134, the one or more network links 144, and/or the one or more network links 148 may be different from the number depicted in FIGS. 1 and 2 and may include one, two, or more than two. In some examples, each of one or more network links 114, the one or more network links 124, the one or more network links 134, the one or more network links 144, and/or the one or more network links 148 may be the same and/or different in number.

According to some embodiments, it may not be necessary for unit 120 to forward network traffic for node 200 using ICL 138 and unit 110 when only some of the one or more network links 124 fail. In some examples, unit 120 may still forward network traffic around the failed network links and directly to node 200 by using any of the other remaining links in the one or more network links 124. In some examples, the LAG hashing mechanism for LAG 126 may hash the network traffic to the other remaining links in the one or more network links 124.

Figure 3:
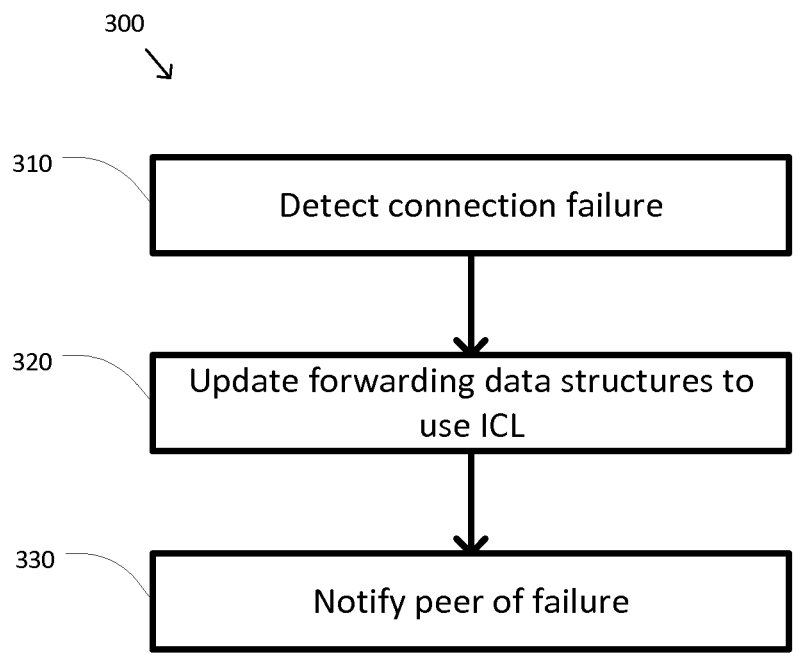
FIG. 3 is a simplified diagram showing a method of connection failure handing according to some embodiments.

FIG. 3 is a simplified diagram showing a method 300 of connection failure handing according to some embodiments. As shown in FIG. 3, the method 300 includes a process 310 for detecting a connection failure, a process 320 for updating forwarding data structures to use an ICL, and a process 330 for notifying a peer of the failure. According to certain embodiments, the method 300 of link failure handling can be performed using variations among the processes 310-330 as would be recognized by one of ordinary skill in the art. In some embodiments, one or more of the processes 310-330 of method 300 may be implemented, at least in part, in the form of executable code stored on non-transient, tangible, machine readable media that when run by one or more processors (e.g., one or more processors in the nodes 100 and/or 200 and/or the units 110 and/or 120) may cause the one or more processors to perform one or more of the processes 310-330.

At the process 310, a connection failure may be detected. In some examples, the connection failure may indicate that a first network switching unit is not able to forward network traffic directly to a second network switching unit. In some examples, the connection failure may be a failure in one or more ports of the first network switching unit. In some examples, the connection failure may be a failure in one or more network links coupling the first network switching unit and the second network switching unit. In some examples, the connection failure may be a failure in one or more ports of the second network switching unit. In some examples, the connection failure may include a combination of port, network link, and/or other failures. In some examples, the connection failure may include failures associated with all of the ports in a corresponding LAG. In some examples, the connection failure may be the failure 160. In some examples, the connection failure may prohibit the first network switching unit from forwarding network traffic directly to the second network switching unit.

At the process 320, forwarding data structures may be updated to use an ICL. According to some embodiments, forwarding data structures in network switching units may typically be arranged as next hop tables. In some examples, the forwarding data structures may include one or more tables selected from a group comprising layer 2 (L2) media access control (MAC) tables, layer 3 (L3) forwarding information bases (FIB), LAG hashing tables, and the like. In some examples, a L2 MAC table may map destination MAC addresses to a port or a LAG that designates the next hop in a path to each known destination MAC address. In some examples, a L3 FIB may similarly map destination IP addresses to a port or a LAG that designates the next hop in a path to each known destination IP address. In some examples, the L2 MAC table and/or the L3 FIB may include hundreds or even thousands of next hop entries using a particular port or LAG. In some examples, the LAG hashing table may map LAG IDs to one or more ports.

When the connection failure occurs, the forwarding data structures may be replaced with alternate paths to destinations included in the forwarding data structures. In some examples, the LAG hashing table may be updated to include one or more ports associated with the ICL in the entry for the LAG associated with the connection failure. In some examples, the L2 MAC table may be updated to include the one or more ports associated with the ICL in each entry associated with one or more ports and/or the LAG associated with the connection failure. In some examples, the L3 FIB may be updated to include the one or more ports associated with the ICL in each entry associated with the one or more ports and/or the LAG associated with the connection failure. In some examples, the updates to the forwarding data structures may take as long as one second to complete.

At the process 330, a peer unit may be notified of the failure. According to some embodiments, the peer unit may implement egress mask filtering of incoming network traffic. In some examples, egress mask filtering may prevent network traffic received over the ICL from being forwarded over a VLT. In some examples, egress mask filtering may prevent unnecessary and/or undesirable packet duplication. In some examples, egress mask filtering may achieve source suppression. In some examples, egress mask filtering may prevent any network traffic rerouted over the ICL from being properly forwarded using the VLT. In the examples of FIG. 2, egress mask filtering may prevent unit 110 from forwarding network traffic received over the ICL 138 to node 200 as depicted by the flow arrow 162. In some examples, the egress mask filtering may be disabled in the peer unit by notifying the peer unit of the connection failure. The notification may inform the peer unit that it will be receiving network traffic for the VLT over the ICL and that the peer unit should forward that network traffic over the VLT. In the examples of FIG. 2, unit 120 may notify unit 110 of the failure 160 so that network traffic forwarded from unit 120 to unit 110 over the ICL 138 may be forwarded to node 200 using VLT 139. In some examples, notifying the peer unit of the connection failure and the peer unit processing the connection failure may take as long as several seconds to complete.

According to some embodiments, a time taken for processes 320 and 330 to complete may be as long as several seconds. Until processes 320 and 330 are able to complete, it may not be possible to successfully forward network traffic over the ICL. In some examples, this may represent a significant loss of network traffic. In some examples, when high bandwidth traffic is being handled, the loss of network traffic may exceed several gigabits of data. In some embodiments, the loss of network traffic may result in undesirable failure in one or more network protocols. In some examples, the one or more network protocols include the bidirectional forwarding detection (BFD) protocol. In the BFD protocol, keep alive messages may occur at approximately 50 millisecond intervals and a hold interval may be only 150 milliseconds. A temporary network failure of several seconds may result in the undesirable failure of BFD. Accordingly, it would be advantageous to have more rapid connection failure handling.

Figure 4:
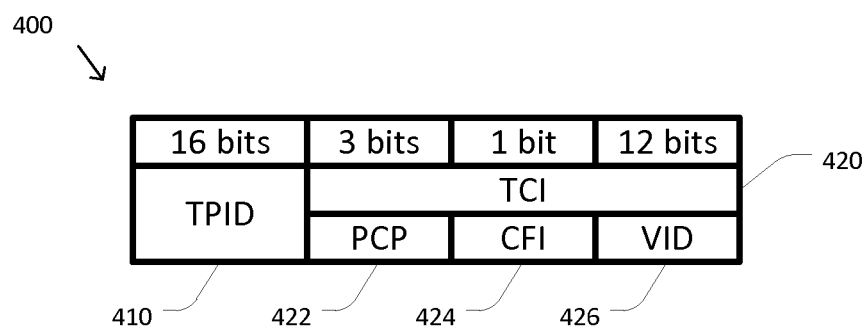
FIG. 4 is a simplified diagram of an IEEE 802.1q header.

FIG. 4 is a simplified diagram of an IEEE 802.1q header 400. The IEEE 802.1q protocol may often be used to support forwarding of network traffic using virtual local area networks (VLANs) and/or VLTs. In the IEEE 802.1q protocol, the 8021.q header 400 may be inserted into an Ethernet frame or packet between a source MAC field and an ether type field. As shown in FIG. 4, the 802.1q header 400 may include a 16-bit tag protocol ID (TPID) field 410 and a 16-bit tag control information (TCI) field 420. The TCI field 420 may include a 3-bit priority code point (PCP) field 422, a 1-bit canonical format indicator (CFI) bit 424, and a 12-bit VLAN ID (VID) field 426. In some examples, the CFI bit 424 is not used by Ethernet and may always be set to 0. Thus, according to some embodiments, the CFI bit 424 may be used by suitably aware network units to indicate that network traffic including a 1 in the CFI bit 424 may be processed and/or forwarded differently.

Figure 5:
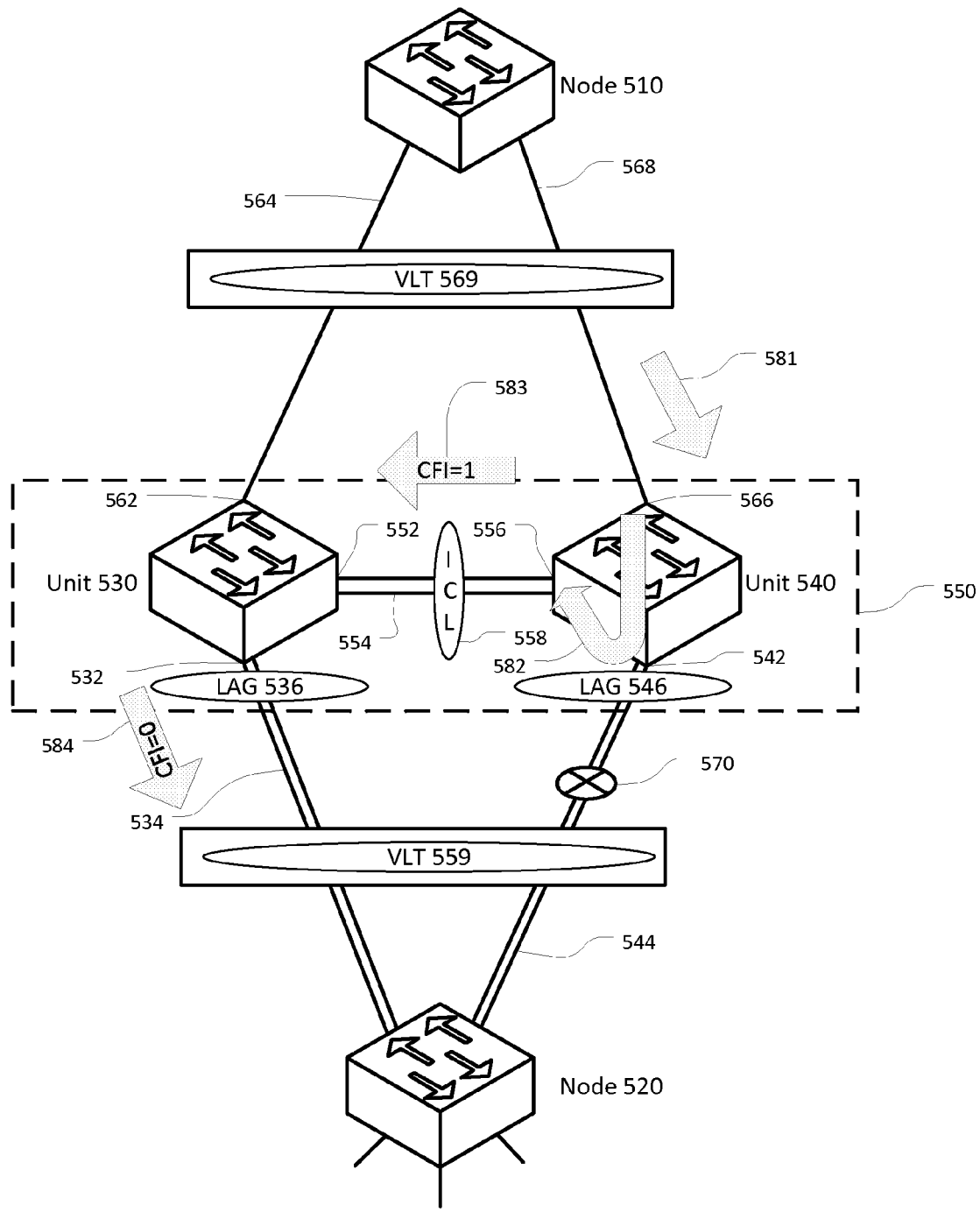
FIG. 5 is a simplified diagram of a network with connection failure handling according to some embodiments.

FIG. 5 is a simplified diagram of a network with connection failure handling according to some embodiments. As shown in FIG. 5, a network switching device or node 510 has several options for forwarding and/or routing network packets to a network switching device or node 520. More specifically, node 510 can forward packets to node 520 using one of several paths that utilize intervening network switching units or more simply units 530 and 540.

In the particular configuration of FIG. 5, both units 530 and 540 are taking advantage of parallelization in the network links between themselves and both nodes 510 and 520. As FIG. 5 shows, unit 530 may include one or more ports 532 that may be coupled to one or more corresponding network links 534 for coupling unit 530 to node 520. Because unit 530 includes one or more ports 532 coupled to one or more network links 534 for exchanging network traffic with the same destination (i.e., node 520), unit 530 may combine the one or more ports 532 into a LAG 536. When unit 530 needs to forward network traffic to node 520 it may do so by directing the network traffic to LAG 536. Similarly, unit 540 may include one or more ports 542 that may be coupled to one or more corresponding network links 544 for coupling unit 540 to node 520. Unit 540 may combine the one or more ports 542 into a LAG 546. When unit 540 needs to forward network traffic to node 520 it may do so by directing the network traffic to LAG 546.

Because units 530 and 540 both have connections to both node 510 and node 520, they may be clustered together to form a peer group 550 where unit 530 and unit 540 are considered peer units. As shown in FIG. 5, unit 530 may include one or more ports 552 that may be coupled to one or more corresponding network links 554. Unit 540 may also include one or more ports 556 that may be coupled to the one or more corresponding network links 554. The one or more network links 554 may form an ICL 558. The one or more network links 534 and the one more network links 544 may form a VLT 559 coupling the peer group 550 with the node 520.

Although depicted in somewhat simpler form, peer group 550 may be coupled similarly to node 510. Unit 530 may include one or more ports 562 that may be coupled to one or more corresponding network links 564 that may couple unit 530 to node 510. Similarly, unit 540 may include one or more ports 566 that may be coupled to one or more corresponding network links 568 that may couple unit 540 to node 510. The one or more network links 564 and the one more network links 568 may form a VLT 569 coupling the peer group 550 with the node 510.

As additionally shown in FIG. 5, the connection between unit 540 and node 520 has failed as depicted by a failure 570. In some examples, the failure 570 may be a failure in the one or more ports 542. In some examples, the failure 570 may be a failure in the one or more network links 544. In some examples, the failure 570 may be a failure at node 520. In some examples, the failure 570 may include a combination of port, network link, and/or other failures. As a result of the failure 570, it is no longer possible for packets to be forwarded from unit 540 to node 520 using the one or more network links 544 or the LAG 546.

According to some embodiments, unit 540 may support LAG failover. In LAG failover, when some or all network links associated with a LAG are down, a substitute LAG may be specified which may automatically be used to forward network traffic sent to the LAG network link that is down. In some examples, the LAG failover may be implemented in hardware. In some examples, LAG failover may be able to provide the substitute LAG in 10 microseconds or less. As shown in FIG. 5, LAG 546 may be supported by LAG failover and ICL 558 may be identified as the substitute LAG. Thus, when LAG 546 is down and forwarding data structures of unit 540 direct network traffic to LAG 546, the network traffic may be automatically directed to ICL 558.

As shown in FIG. 5, network traffic may be forwarded from node 510 to node 520 using the LAG failover of unit 540. Node 510 may forward a packet of the network traffic to unit 540 using the network link 581 as depicted by a flow arrow 581. When the packet is received by unit 540, the forwarding data structures of unit 540 may indicate that the packet should be forwarded to LAG 546 in order to reach node 520. As noted previously, failure 570 prevents LAG 546 from forwarding the packet directly to node 520. Recognizing that LAG 546 is down, the LAG failover of unit 540 may substitute ICL 558 for the LAG 546. The packet may then be redirected to the ICL 558 as the substitute for the LAG 546 as depicted by a flow arrow 582. As the redirected packet is prepared for forwarding over ICL 558, a CFI bit of the packet may be changed to 1. The altered packet may then be forwarded over the ICL 558 as depicted by a flow arrow 583. When the altered packet is received at unit 530, unit 530 may detect that the CFI bit is 1 indicating that egress port filtering may be ignored for the altered packet. Unit 530 may then change the CFI bit back to 0, indicating normal future treatment of the packet, and the packet may then be forwarded to node 520 using LAG 536 as depicted by a flow arrow 584.

According to some embodiments, the connection failure handling of FIG. 5 may overcome some of the deficiencies of the method 300. In some examples, the use of LAG failover by unit 540 to redirect the packet to ICL 558 may handle the redirection of the packet in 10 microseconds or less, which may be significantly faster than a time taken to update the forwarding data structures during the process 320. In some examples, the altering of the packet by unit 540 to change the CFI bit to 1 and the ignoring of egress port filtering by unit 530 may allow the packet to be forwarded on to node 520 without having to wait for unit 530 to be notified of failure 570 during the process 330. Consequently, network traffic may be forwarded around failure 570 without the unacceptable delays of the method 300. In some examples, the connection failure handling of FIG. 5 may be rapid enough to avoid the undesirable failure of BFD.

As discussed above and further emphasized here, FIG. 5 is merely an example, which should not unduly limit the scope of the claims. One of ordinary skill in the art would recognize many variations, alternatives, and modifications. According to some embodiments, the peer group 550 may include more than two units functioning in parallel. This arrangement allows unit 540 to choose from multiple peer units to forward network traffic around the failure 570. According to some embodiments, the number of network links in the one or more network links 534, the one or more network links 544, the one or more network links 554, the one or more network links 564, and/or the one or more network links 568 may be different from the number depicted in FIG. 5 and may include one, two, or more than two. In some examples, each of one or more network links 534, the one or more network links 544, the one or more network links 554, the one or more network links 564, and/or the one or more network links 568 may be the same and/or different in number.

Figure 6:
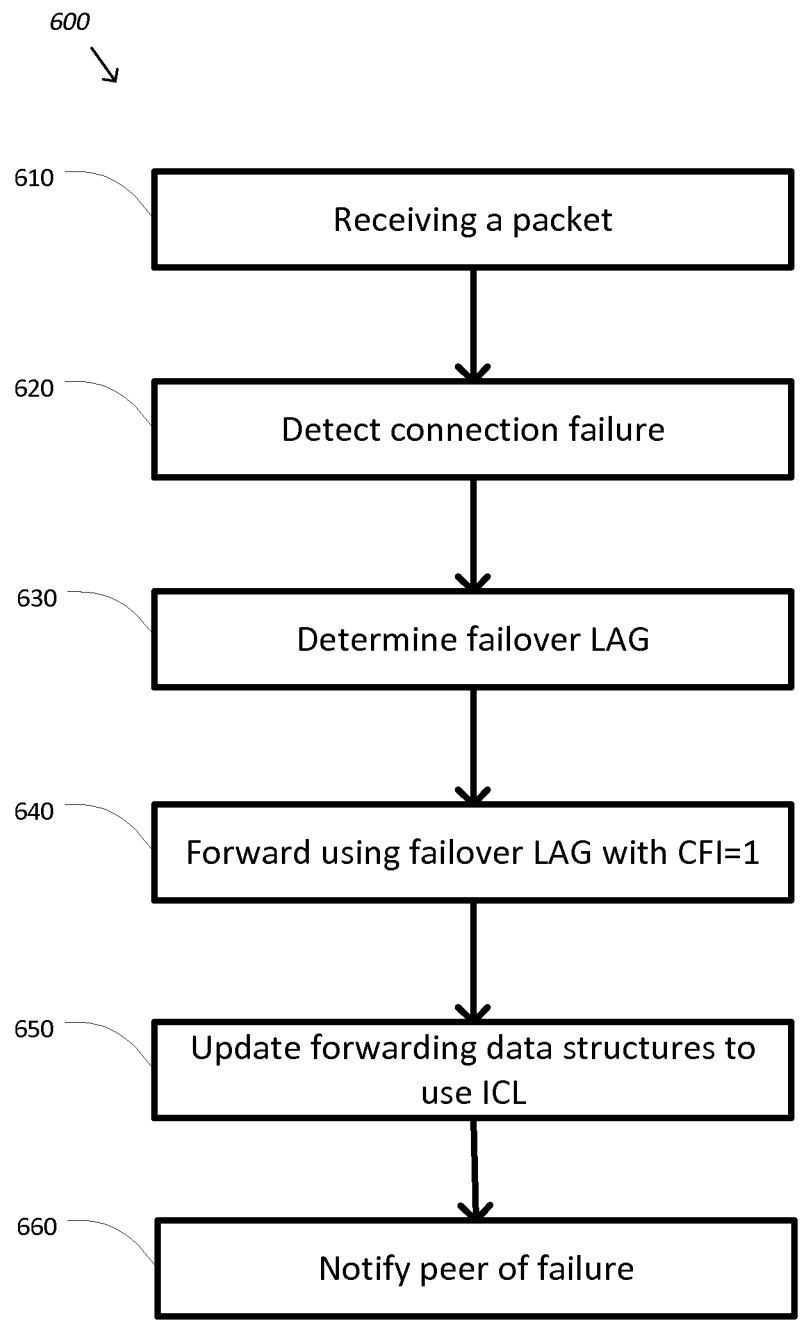
FIG. 6 is a simplified diagram showing a method of connection failure handing according to some embodiments.

FIG. 6 is a simplified diagram showing a method 600 of connection failure handing according to some embodiments. As shown in FIG. 6, the method 600 includes a process 610 for receiving a packet; a process 620 for detecting a connection failure, a process 630 for determining a failover LAG, a process 640 for forwarding using the failover LAG with the CFI bit set to 1, a process 650 for updating forwarding data structures to use an ICL, and a process 660 for notifying a peer of the failure. According to certain embodiments, the method 600 of connection failure handling can be performed using variations among the processes 610-660 as would be recognized by one of ordinary skill in the art. In some embodiments, the process 650 and/or the process 660 may be omitted. In some embodiments, one or more of the processes 610-660 of method 600 may be implemented, at least in part, in the form of executable code stored on non-transient, tangible, machine readable media that when run by one or more processors (e.g., one or more processors in the nodes 510 and/or 520 and/or the units 530 and/or 540) may cause the one or more processors to perform one or more of the processes 610-660.

At the process 610, a packet may be received. In some examples, the packet may be received at a first network switching unit. In some examples, the packet should be forwarded to a second network switching unit.

At the process 620, a connection failure may be detected. In some examples, the connection failure may indicate that the first network switching unit is not able to forward network traffic, including the packet, to the second network switching unit. In some examples, the connection failure may be a failure in one or more ports of the first network switching unit. In some examples, the connection failure may be a failure in one or more network links coupling the first network switching unit and the second network switching unit. In some examples, the connection failure may be a failure in one or more ports of the second network switching unit. In some examples, the connection failure may include a combination of port, network link, and/or other failures. In some examples, the connection failure may include failures associated with all of the ports in a corresponding LAG. In some examples, the connection failure may be the failure 570. In some examples, the connection failure may prohibit the first network switching unit from forwarding network traffic directly to the second network switching unit.

At the process 630, a failover LAG may be determined. In some examples, where the first network switching unit includes support for LAG failover, the LAG associated with the connection failure may designate another LAG as a substitute LAG. In some examples, the another LAG may be an ICL. What the substitute LAG is designated, the failover LAG may be determined to be the substitute LAG. In some examples, the failover LAG may be the ICL. In some examples, the ICL is the ICL 558.

At the process 640, the failover LAG may be used for forwarding with the CFI bit set to 1. In some examples, the CFI bit may be included in an IEEE 802.1q header. In some examples, when the packet is redirected to the failover LAG, the packet may be altered to set the CFI bit to 1. The altered packet may then be forwarded using the failover LAG. In some examples, the altered packet may be a packet associated with the flow arrow 583. In some examples, the packet may be altered and forwarded using an access control list (ACL) entry. In some examples, the ACL entry may filter packets being redirected to the ICL. In some examples, the ACL entry may trigger processing that changes the CFI bit to 1.

At the optional process 650, forwarding data structures may be updated to use the ICL. According to some embodiments, forwarding data structures in network switching units may typically be arranged as next hop tables. In some examples, the forwarding data structures may include one or more tables selected from a group comprising layer 2 (L2) media access control (MAC) tables, layer 3 (L3) forwarding information bases (FIB), LAG hashing tables, and the like. In some examples, a L2 MAC table may map destination MAC addresses to a port or a LAG that designates the next hop in a path to each known destination MAC address. In some examples, a L3 FIB may similarly map destination IP addresses to a port or a LAG that designates the next hop in a path to each known destination IP address. In some examples, the L2 MAC table and/or the L3 FIB may include hundreds or even thousands of next hop entries using a particular port or LAG. In some examples, the LAG hashing table may map LAG IDs to one or more ports.

When the connection failure occurs, the forwarding data structures may be updated to include alternate paths to destinations included in the forwarding data structures. In some examples, the LAG hashing table may be updated to include one or more ports associated with the ICL in the entry for the LAG associated with the connection failure. In some examples, the L2 MAC table may be updated to include the one or more ports associated with the ICL in each entry associated with one or more ports and/or the LAG associated with the connection failure. In some examples, the L3 FIB may be updated to include the one or more ports associated with the ICL in each entry associated with the one or more ports and/or the LAG associated with the connection failure. In some examples, the updates to the forwarding data structures may take as long as one second to complete.

At the optional process 660, a peer unit may be notified of the failure. In some examples, the egress mask filtering may be disabled in the peer unit by notifying the peer unit of the connection failure. The notification may inform the peer unit that it will be receiving network traffic for a VLT over the ICL and that the peer unit should forward that network traffic over the VLT. In the examples of FIG. 5, unit 540 may notify unit 530 of the failure 570 so that network traffic forwarded from unit 540 to unit 530 over the ICL 558 may be forwarded to node 520 using VLT 559. In some examples, notifying the peer unit of the connection failure and the peer unit processing the connection failure may take as long as several seconds to complete.

According to some embodiments, the method 600 of network connection handling may include two separate ways for the first switching unit to forward network traffic around the connection failure. In some examples, the processes 630 and 640 may quickly redirect network traffic through the peer unit over the ICL using LAG failover. In some examples, the processes 630 and 640 may be used as a temporary forwarding solution until processes 650 and 660 have time to complete. In some examples, the processes 630 and 640 may be used as an only solution when the processes 650 and 660 are omitted. In some examples, the processes 650 and 660 may also redirect network traffic through the peer unit over the ICL.

Figure 7:
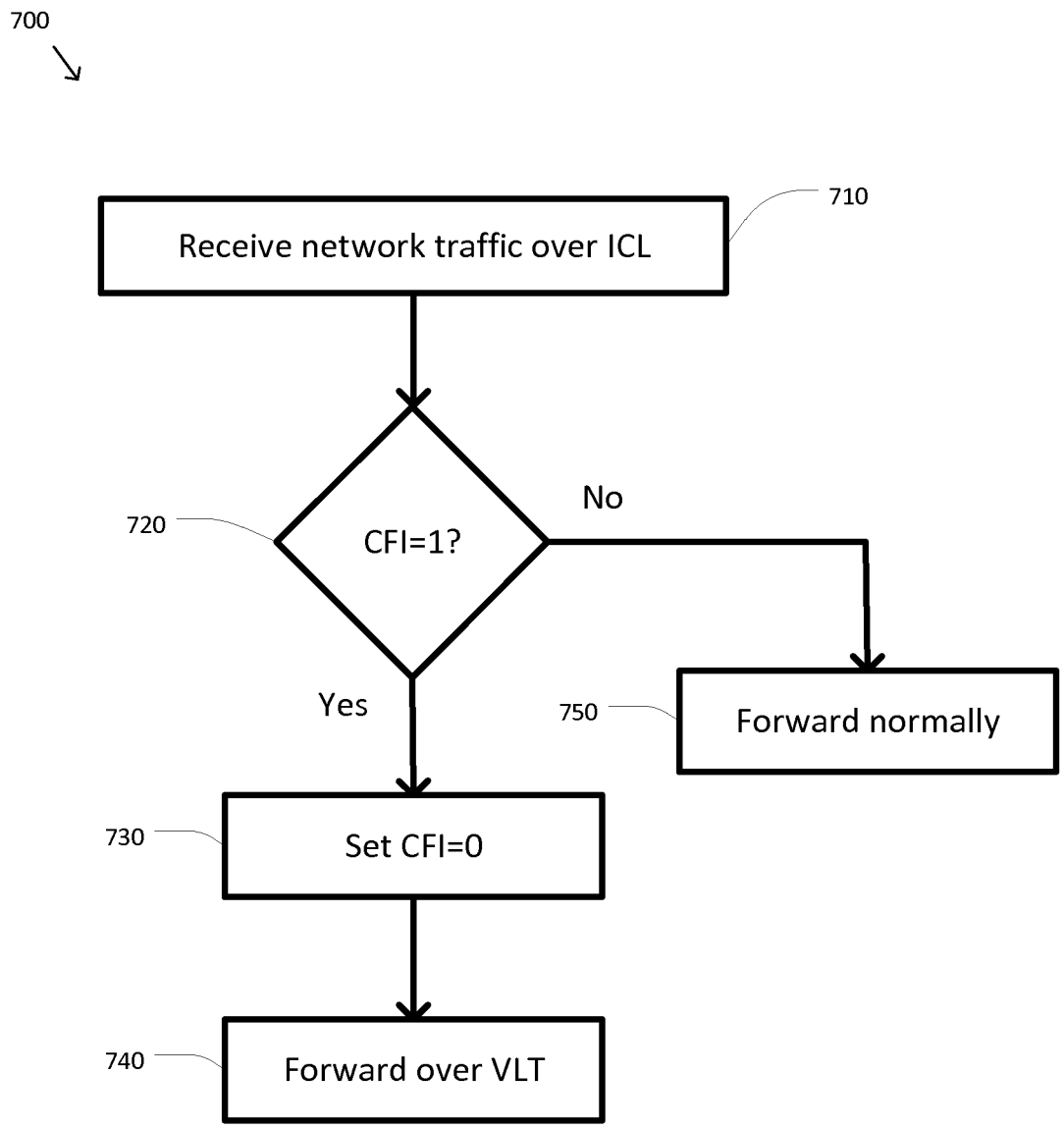
FIG. 7 is a simplified diagram showing a method of forwarding according to some embodiments.

FIG. 7 is a simplified diagram showing a method 700 of forwarding according to some embodiments. As shown in FIG. 7, the method 700 includes a process 710 for receiving network traffic over an ICL, a process 720 for determining whether the CFI bit is 1, a process 730 for setting the CFI bit to 0, a process 740 for forwarding over a VLT, and a process 750 for forwarding normally. According to certain embodiments, the method 700 of forwarding can be performed using variations among the processes 710-750 as would be recognized by one of ordinary skill in the art. In some embodiments, one or more of the processes 710-750 of method 700 may be implemented, at least in part, in the form of executable code stored on non-transient, tangible, machine readable media that when run by one or more processors (e.g., one or more processors in the nodes 510 and/or 520 and/or the units 530 and/or 540) may cause the one or more processors to perform one or more of the processes 710-750.

At the process 710, network traffic may be received over an ICL. In some examples, a packet associated with the network traffic may be received over the ICL. In some examples, the packet may have been forwarded by a peer unit. In some examples, the packet may be an altered packet forwarded as a result of the process 640. In some examples, the packet received may be a packet associated with the flow arrow 583.

At the process 720, it may be determined whether the CFI bit is 1. The CFI bit may be included in the packet received during the process 710. In some examples, the CFI bit may be included in an IEEE 802.1q header. In some examples, an ACL entry may be used to determine whether the CFI bit is 1. When it is determined that the CFI bit is 1, the packet may be forwarded using the processes 730 and 740. When it is determined that the CFI bit is not 1, the packet may be forwarded normally in the process 750.

At the process 730, the CFI bit is set to 0. When the received packet includes the IEEE 802.1q header with the CFI bit set to 1, the CFI bit may be set to 0 before the packet is forwarded. In some examples, by setting the CFI bit to 0 the packet may be forwarded to another network switching unit, which may then forward the packet normally. In some examples, the ACL entry may trigger processing that changes the CFI bit to 0.

At the process 740, a VLT is used for forwarding. In some examples, the VLT may be specified based on information in the packet received during the process 710. The packet received during the process 710 may be forwarded using the VLT after the CFI bit is set to 0 during the process 730. In some examples, the ACL entry may trigger processing that forwards the packet with the CFI bit set to 0 using the VLT.

In some embodiments, a single ACL entry may be used during the processes 720-740. In some embodiments, multiple ACL entries may be used during the processes 720-740.

At the process 750, normal forwarding occurs. When the packet received during the process 710 includes a CFI bit set to 0 it may be forwarded normally. In some examples, when egress port filtering is used, the packet received during the process 710 may be dropped and not forwarded because egress port filtering may prevent the forwarding of packets over the VLT that are received over the ICL.

Figure 8:
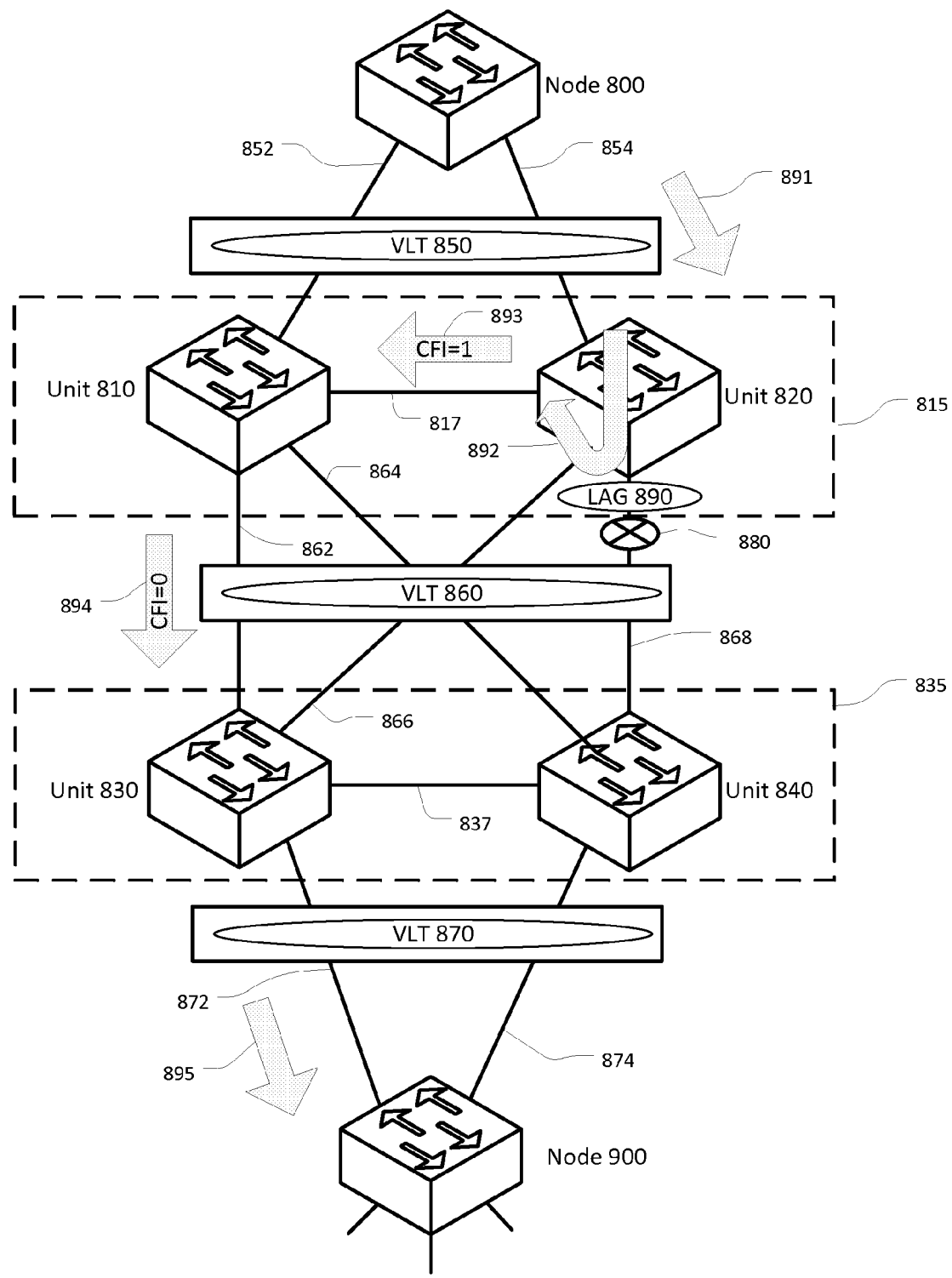
FIG. 8 shows a simplified diagram of a network including a square VLT according to some embodiments.

FIG. 8 shows a simplified diagram of a network including a square VLT according to some embodiments. As shown in FIG. 8, a node 800 has several options for forwarding and/or routing network packets to a node 900. More specifically, node 800 can forward packets to node 900 using one of several paths that utilize intervening network switch units 810, 820, 830, and 840. In the particular configuration of FIG. 8, node 800 may first utilize a VLT 850 to reach either unit 810 along network link 852 or reach unit 820 along network link 854. Units 810 and unit 820 may be clustered together to form a peer group 815 where unit 810 and unit 820 are considered peer units. Unit 810 and unit 820 may be coupled using an ICL 817.

As also shown in FIG. 8, peer group 815 may utilize a VLT 860 to reach either unit 830 or unit 840. Unit 810 may reach unit 830 along network link 862 or reach unit 840 along network link 864. Unit 820 may reach unit 830 along network link 866 or reach unit 840 along network link 868. Unit 830 and unit 840 may also be clustered to form a peer group 835 that also includes an ICL 837. Collectively the peer groups 815 and 835 may form a square VLT as suggested by the geometric relationship between the units 810, 820, 830, and 840.

As further shown in FIG. 8, peer group 835 may utilize a VLT 870 to reach node 900. Unit 830 may reach node 900 along network link 872 and unit 840 may reach node 900 along network link 874.

As depicted in FIG. 8, node 800 may send network traffic to node 900 through one of numerous paths through the peer groups 815 and 835. For the purposes of illustration, assume that one or more forwarding data structures of node 800, unit 820, and unit 840 include forwarding information that may result in the forwarding of network traffic from node 800 to unit 820 using network link 854 as depicted by a flow arrow 891, from unit 820 to unit 840 using network link 868, and finally from unit 840 to node 900 using network link 874. When a connection failure 880 occurs between unit 820 and unit 840, network traffic for node 900 may be redirected using alternate paths using the methods 600 and 700.

In some embodiments, the methods 600 and 700 may be applied to network traffic being forwarded from node 800 to node 900. When a packet from the network traffic is received by unit 820 during the process 610 from node 800 with a destination of node 900 or beyond (as depicted by the flow arrow 891), the forwarding data structure in unit 820 may direct the packet to a LAG 890 associated with the network link 568 for forwarding to unit 840. As noted above, connection failure 880 may prohibit forwarding of the packet directly to unit 840 using LAG 890 so the connection failure 880 may be detected during the process 620. Using the LAG failover for LAG 890, ICL 817 may be determined to be the failover LAG during the process 630. The packet may then be redirected to ICL 817 as depicted by a flow arrow 892. The CFI bit may be set to 1, and the altered packet may be forwarded to unit 810 using ICL 817 as depicted by a flow arrow 893 during the process 640. According to some embodiments, the use of the LAG failover for LAG 890 may only be temporary. In some examples, the LAG associated with VLT 860 may still be used to forward network traffic to peer group 835 from unit 820 using the network link 866. In some examples, a LAG hashing table for unit 820 may be updated to remove network link 868 from the LAG associated with VLT 860. In some examples, the LAG hashing table for unit 820 may be updated using a process similar to the process 650.

The altered packet may then be received by unit 810 during the process 710. The CFI bit may be determined to be 1 during the process 720. The CFI bit may then be set to 0 during the process 730 and the packet may then be forwarded to unit 830 using VLT 860 as depicted by a flow arrow 894 during the process 740. The packet may then be received by unit 830 where it may be forwarded normally to node 900 as depicted by a flow arrow 895.

As discussed above and further emphasized here, FIG. 8 is merely an example, which should not unduly limit the scope of the claims. One of ordinary skill in the art would recognize many variations, alternatives, and modifications. According to some embodiments, the peer group 815 and/or the peer group 835 may include more than two units functioning in parallel. This arrangement allows adjoining nodes and clusters to choose from multiple forwarding paths that still exist through the cluster 815 and/or the cluster 835 during network failures. According to some embodiments, any of the network links 817, 837, 852, 854, 862, 864, 866, 868, 872 and/or 874 may each include more than one network link. According to some embodiments, the same LAG failover may be used to forward traffic around a failure in unit 840 as is used to forward network traffic around connection failure 880.

According to some embodiments, a connection failure between unit 840 and node 900 may be handled using a similar LAG failover in unit 840 as shown in the examples of FIG. 5. The LAG failover in unit 840 may redirect network traffic for a LAG associated with the network link 874 to the ICL 837. The network traffic may then be forwarded over the ICL 837 with the CFI bit set to 1. When the network traffic is received at unit 830 the CFI bit may be set to 0 and the network traffic forwarded to node 900 using the VLT 870 and the network link 872.

Some embodiments of nodes 510, 520, 800 and/or 900 and/or units 530, 540, 810, 820, 830, and/or 840 may include non-transient, tangible, machine readable media that include executable code that when run by one or more processors may cause the one or more processors to perform the processes of methods 600 and/or 700 as described above. Some common forms of machine readable media that may include the processes of methods 600 and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of connection failure handling, the method comprising:
    receiving a packet at a first network switching unit, where the packet is to be forwarded to a second network switching unit;
    detecting a failure in a network connection between the first network switching unit and the second network switching unit, the network connection being associated with a first link aggregation group (LAG) of the first network switching unit;
    determining a second LAG as a failover LAG for the first LAG, the second LAG being associated with an inter-chassis link (ICL);
    redirecting the packet to the second LAG;
    altering the packet to set a redirection status bit to a logic value, wherein the logic value indicates that egress port filtering is not to be applied to the packet; and
    forwarding the altered packet using the ICL.

2. The method of claim 1 wherein the failure in the network connection prevents the first network switching unit from forwarding the packet directly to the second network switching unit.

3. The method of claim 1 wherein:
    the redirection status bit is a CFI bit; and
    the logic value is 1.

4. The method of claim 3 wherein the CFI bit is included in an IEEE 802.1q header.

5. The method of claim 1, further comprising detecting the redirecting of the packet using an access control list entry.

6. The method of claim 5 wherein the access control list entry initiates the altering of the packet and the forwarding of the altered packet.

7. The method of claim 1, further comprising updating forwarding data structures.

8. The method of claim 7 wherein updating forwarding data structures comprises updating one or more forwarding data structure entries to replace references associated with the first LAG with references associated with the second LAG.

9. The method of claim 7 wherein the forwarding data structures include one or more selected from a list consisting of a L2 MAC table, a L3 FIB, and a LAG hashing table.

10. The method of claim 7, further comprising:
    notifying a peer unit of the failure;
    wherein the peer unit is coupled to the first network switching unit using the ICL.

11. The method of claim 1 wherein the first network switching unit and the second network switching unit are coupled using a virtual link trunk.

12. A method of forwarding, the method comprising:
receiving a packet at a first network switching unit from a second network switching unit over an inter-chassis link, the first network switching unit and the second network switching unit being peers and where the packet is to be forwarded to a third network switching unit;
determining whether the packet includes a redirection status bit set to a first logic value; and
when the redirection status bit is set to the first logic value:
altering the packet by setting the redirection status bit to a second logic value different from the first logic value; and
forwarding the altered packet to the third network switching unit;
wherein when the redirection status bit is set to the first logic value, egress port filtering is not applied to the packet.

13. The method of claim 12 wherein:
the redirection status bit is a CFI bit;
the first logic value is 1; and
the second logic value is 0.

14. The method of claim 13 wherein the CFI bit is included in an IEEE 802.1q header.

15. The method of claim 12 wherein determining whether the packet includes the redirection status bit set to the first logic value comprises matching the packet to an access control list entry.

16. The method of claim 15 wherein the access control list entry initiates the altering of the packet and the forwarding of the altered packet.

17. The method of claim 12 wherein the first network switching unit and the third network switching unit are coupled using a virtual link trunk.

18. An information handling system comprising:
a communications network, the communications network comprising:
a first network switching unit;
a first link aggregation group (LAG) coupling the first network switching unit to a second network switching unit; and
a second LAG coupling the first network switching unit to a peer unit using an inter-chassis link (ICL);
wherein the first network switching unit is configured to:
receive a first packet, where the packet is to be forwarded to the second network switching unit;
detect a failure in a network connection between the first network switching unit and the second network switching unit, the network connection being associated with the first LAG;
determine that the second LAG is a failover LAG for the first LAG;
redirect the first packet to the second LAG;
alter the first packet to set a first CFI bit to 1, wherein the first CFI bit of 1 indicates that egress port filtering is not to be applied to the packet; and
forward the altered first packet using the ICL.

19. The information handling system of claim 18 wherein:
the first network switching unit is coupled to a third network switching unit; and
the first network switching unit is further configured to:
receive a second packet over the ICL, where the second packet is to be forwarded to the third network switching unit;
determine whether the second packet includes a second CFI bit set to 1;
when the second CFI bit is set to 1:
alter the second packet by setting the second CFI bit to 0; and
forward the altered second packet to the third network switching unit.

* * * * *